US012703430B2

(12) United States Patent
Sakai et al.

(10) Patent No.: US 12,703,430 B2
(45) Date of Patent: Aug. 11, 2026

(54) FRONT PILLAR LOWER

(71) Applicant: FUTABA INDUSTRIAL CO., LTD., Okazaki (JP)

(72) Inventors: Hiroaki Sakai, Okazaki (JP); Satoshi Kubozono, Okazaki (JP); Miki Kotani, Okazaki (JP)

(73) Assignee: Futaba Industrial Co., Ltd., Okazaki (JP)

( * ) Notice: Subject to any disclaimer, the term of this patent is extended or adjusted under 35 U.S.C. 154(b) by 290 days.

(21) Appl. No.: 18/489,330

(22) Filed: Oct. 18, 2023

(65) Prior Publication Data

US 2024/0149950 A1 May 9, 2024

(30) Foreign Application Priority Data

Nov. 4, 2022 (JP) ................................ 2022-177352

(51) Int. Cl.
*B62D 25/04* (2006.01)

(52) U.S. Cl.
CPC .................................. *B62D 25/04* (2013.01)

(58) Field of Classification Search
CPC ...................................................... B62D 25/04
USPC ............ 296/193.06, 193.05, 203.03, 187.12
See application file for complete search history.

(56) References Cited

U.S. PATENT DOCUMENTS

2003/0146649 A1* 8/2003 Kim ...................... B62D 25/04 296/202
2008/0036235 A1* 2/2008 Ameloot ............... B62D 25/04 296/102
2013/0193716 A1* 8/2013 Kurokawa ............ B62D 25/06 296/193.06
2014/0028056 A1* 1/2014 Nishimura ............ B62D 25/04 296/193.06
2016/0039466 A1* 2/2016 Yamamoto .......... B62D 21/152 296/193.06

(Continued)

FOREIGN PATENT DOCUMENTS

CN 216969814 U 7/2022
JP 2016088135 A 5/2016
JP 2022092823 A 6/2022

OTHER PUBLICATIONS

Notice of Reasons for Refusal for Japanese Patent Application No. 2022-177352 mailed May 14, 2024 (6 pages including English translation).

(Continued)

*Primary Examiner* — Gregory A Blankenship
(74) *Attorney, Agent, or Firm* — Vincent K. Gustafson; Withrow + Terranova, PLLC

(57) ABSTRACT

A front pillar lower includes a joining part where a front pillar lower body, a bracket, and a bulk are joined together. The front pillar lower body includes a ridge portion. The ridge portion includes a top plate and side plates. The bracket includes a main cover covering the top plate from an outside of the ridge portion to provide a space between the main cover and the top plate, and side covers superposed on the side plates from the outside of the ridge portion. The bulk includes a reinforcing portion arranged inside the ridge portion in a position overlapping with the space in thickness directions of the top plate, and flanges superposed on the side plates from an inside of the ridge portion. The joining part joins the side plate, the side cover, and the flange.

6 Claims, 7 Drawing Sheets

(56) References Cited

U.S. PATENT DOCUMENTS

| | | | | |
|---|---|---|---|---|
| 2017/0101133 | A1* | 4/2017 | Emura | B62D 21/157 |
| 2017/0203794 | A1* | 7/2017 | Nakamura | B62D 25/04 |
| 2019/0106154 | A1* | 4/2019 | Lee | B62D 21/15 |
| 2021/0179184 | A1* | 6/2021 | Ohnaka | B62D 25/04 |
| 2021/0387675 | A1* | 12/2021 | Kubozono | B62D 27/023 |
| 2022/0001932 | A1* | 1/2022 | Bodin | B23K 11/11 |
| 2022/0135139 | A1* | 5/2022 | Matsuoka | B62D 21/157<br>296/193.06 |
| 2022/0297759 | A1* | 9/2022 | Nagahama | B62D 27/023 |
| 2024/0149950 | A1* | 5/2024 | Sakai | B62D 25/04 |
| 2025/0128313 | A1* | 4/2025 | Fujii | B23K 20/02 |

OTHER PUBLICATIONS

First Office Action for Chinese Patent Application No. 202311459484.1, mailed Jun. 26, 2026, 15 pages.

* cited by examiner

FRONT PILLAR LOWER

CROSS-REFERENCE TO RELATED APPLICATIONS

This application claims the benefit of Japanese Patent Application No. 2022-177352 filed on Nov. 4, 2022 with the Japan Patent Office, the entire disclosure of which is incorporated herein by reference.

BACKGROUND

The present disclosure relates to a front pillar lower.

A front pillar lower constituting a lower structure of a front pillar of a vehicle is provided with a bracket having an attachment surface for a door hinge. In such a front pillar lower, there is a known configuration in which a bulk (i.e., a reinforcing bracket) is joined to a front pillar lower body having a ridge portion, in addition to the bracket, to improve rigidity (see Japanese Unexamined Patent Application Publication No. 2022-92823 and Japanese Unexamined Patent Application Publication No. 2016-88135).

SUMMARY

In the above-described structure, the bracket is joined to a top plate of the ridge portion of the front pillar lower body. Thus, from viewpoints of load transfer efficiency and securement of a joining space, there occurs a joining order between the bracket and the bulk. This results in an increase in manufacturing costs of the front pillar lower.

An object of one aspect of the present disclosure is to provide a front pillar lower capable of eliminating a joining order of a bracket and a bulk.

One aspect of the present disclosure is a front pillar lower comprising a front pillar lower body extending in up-down directions, a bracket that is fixed to the front pillar lower body and that includes an attachment surface for a door hinge, a bulk fixed to the front pillar lower body, and a first joining part where the front pillar lower body, the bracket, and the bulk are joined together. The front pillar lower body includes a ridge portion extending in longitudinal directions of the front pillar lower body. The ridge portion includes a top plate, and a first side plate and a second side plate extending respectively from two ends of the top plate on both sides in width directions of the front pillar lower body.

The bracket includes a main cover covering the top plate from an outside of the ridge portion to provide a space between the main cover and the top plate, a first side cover superposed on the first side plate from the outside of the ridge portion, and a second side cover superposed on the second side plate from the outside of the ridge portion. The bulk includes a reinforcing portion arranged inside the ridge portion in a position overlapping with the space in thickness directions of the top plate, a first flange superposed on the first side plate from an inside of the ridge portion, and a second flange superposed on the second side plate from the inside of the ridge portion. The first joining part joins the first side plate, the first side cover, and the first flange.

In such a configuration, since the bracket and the bulk can be joined to the ridge portion simultaneously, the joining order of the bracket and the bulk can be eliminated. In addition, since a load in width directions of a vehicle can be received in shear directions at the first joining part, deformation of the front pillar lower body away from the inner panel can be inhibited.

One aspect of the present disclosure may further comprise a second joining part joining the second side plate, the second side cover, and the second flange. Such a configuration can increase a joint strength among the ridge portion, the bracket, and the bulk. As a result, the effect of inhibiting deformation of the bracket is facilitated.

In one aspect of the present disclosure, the first side plate may be slanted toward a lower side and a rear side of the vehicle as viewed from a side of the vehicle. The first flange of the bulk may be positioned above the second flange. In such a configuration, the bulk can be formed by press-molding without producing a negative angle part.

In one aspect of the present disclosure, a part of an outer surface of the top plate covered by the bracket may include a flat surface. In such a configuration, it is possible to reduce occurrence of cracks and wrinkles in the front pillar lower body.

BRIEF DESCRIPTION OF THE DRAWINGS

Example embodiments of the present disclosure will be described hereinafter with reference to the accompanying drawings, in which.

DETAILED DESCRIPTION OF EXEMPLARY EMBODIMENTS

1. First Embodiment

1-1. Configuration

Figure 1:
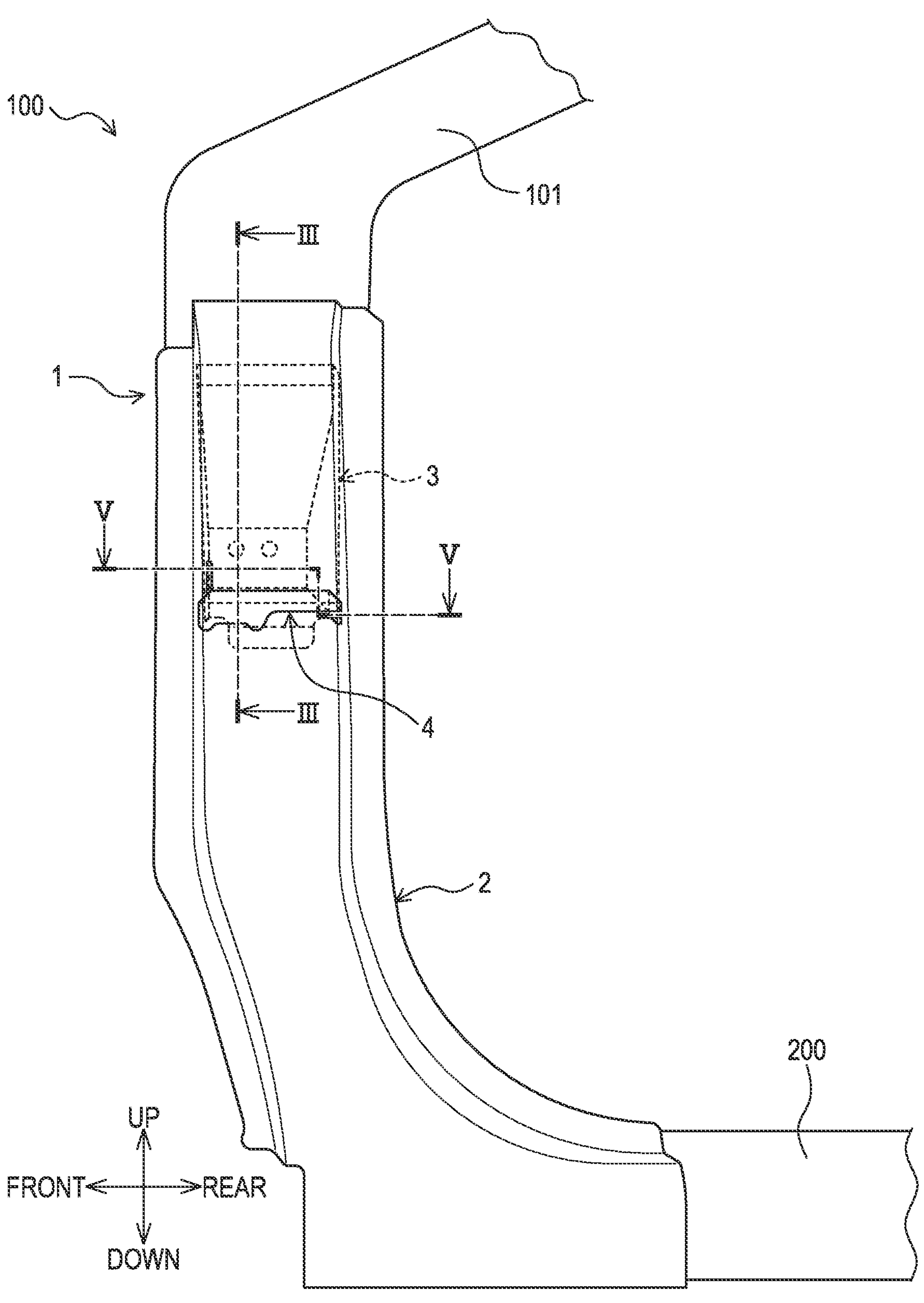
FIG. 1 is a schematic side view of a front pillar lower of an embodiment.

A front pillar 100 shown in FIG. 1 defines a vehicle compartment of a vehicle (i.e., an automobile) together with a rocker 200, a door, a window, and other parts. A front wheel of the vehicle is arranged in front of the front pillar 100. The front pillar 100 and the rocker 200 are provided on either side of the vehicle in width directions (i.e., on each of both left and right sides of the vehicle).

The front pillar 100 constitutes a frame on a front side and an upper side of a door opening of the vehicle. The front pillar 100 comprises a front pillar upper 101 arranged in an upper part of the vehicle compartment and a front pillar lower 1 arranged between the front wheel and the vehicle compartment.

The rocker 200 extends in front-and-rear directions of the vehicle and constitutes a frame on a lower side of the door opening of the vehicle. The rocker 200 is joined to a lower end of the front pillar 100 (specifically, of the front pillar lower 1).

[Front Pillar Lower]

Figure 3:
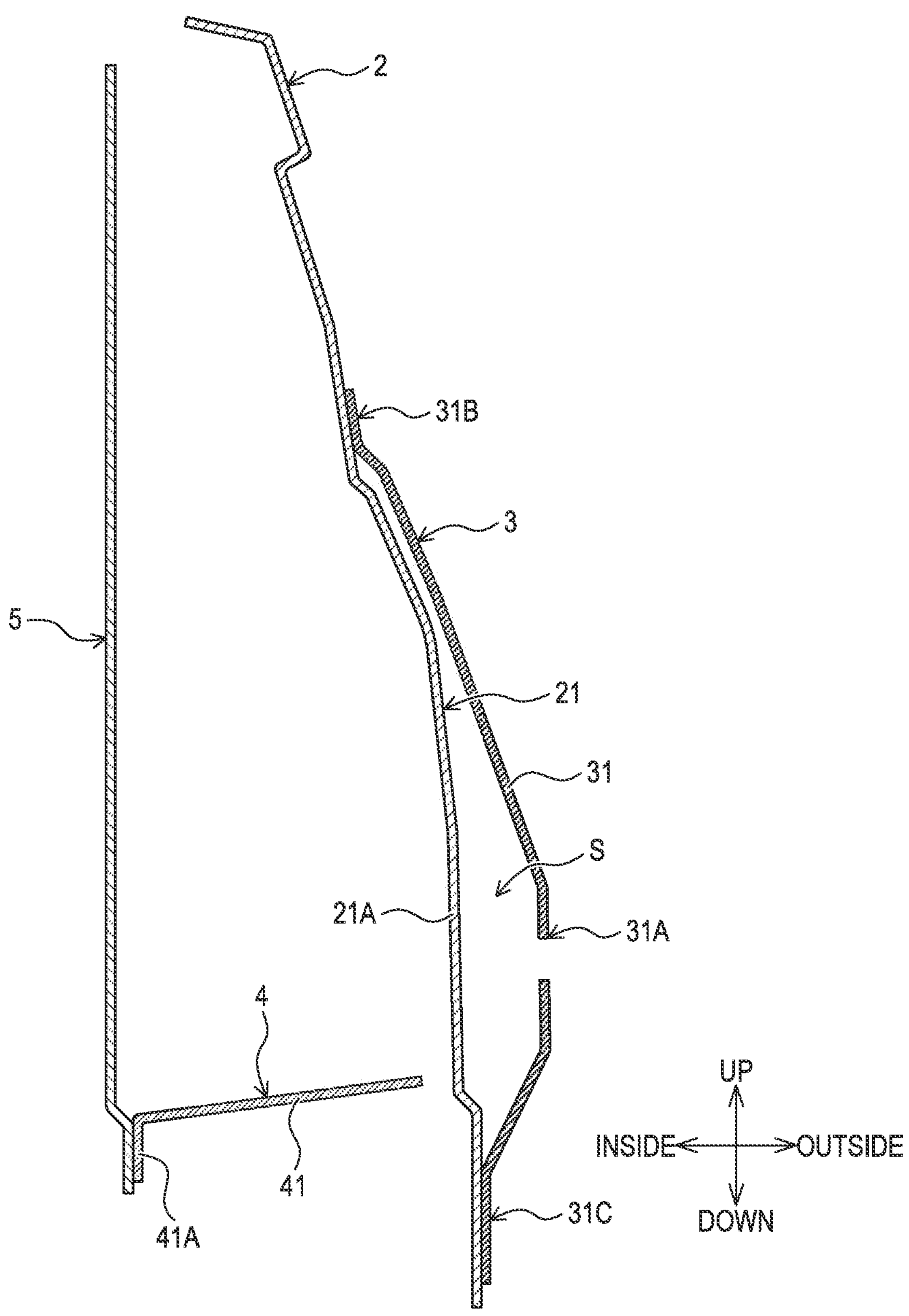
FIG. 3 is a schematic sectional end view taken along the line III-III of FIG. 1.

The front pillar lower 1 comprises a front pillar lower body 2, a bracket 3, a bulk 4, and an inner panel 5 (see FIG. 3).

<Front Pillar Lower Body>

The front pillar lower body 2 is a metal plate member (specifically, a member obtained by bending a plate material by press working) extending in up-down directions and constitutes an outer panel of the front pillar lower 1.

Figure 2:
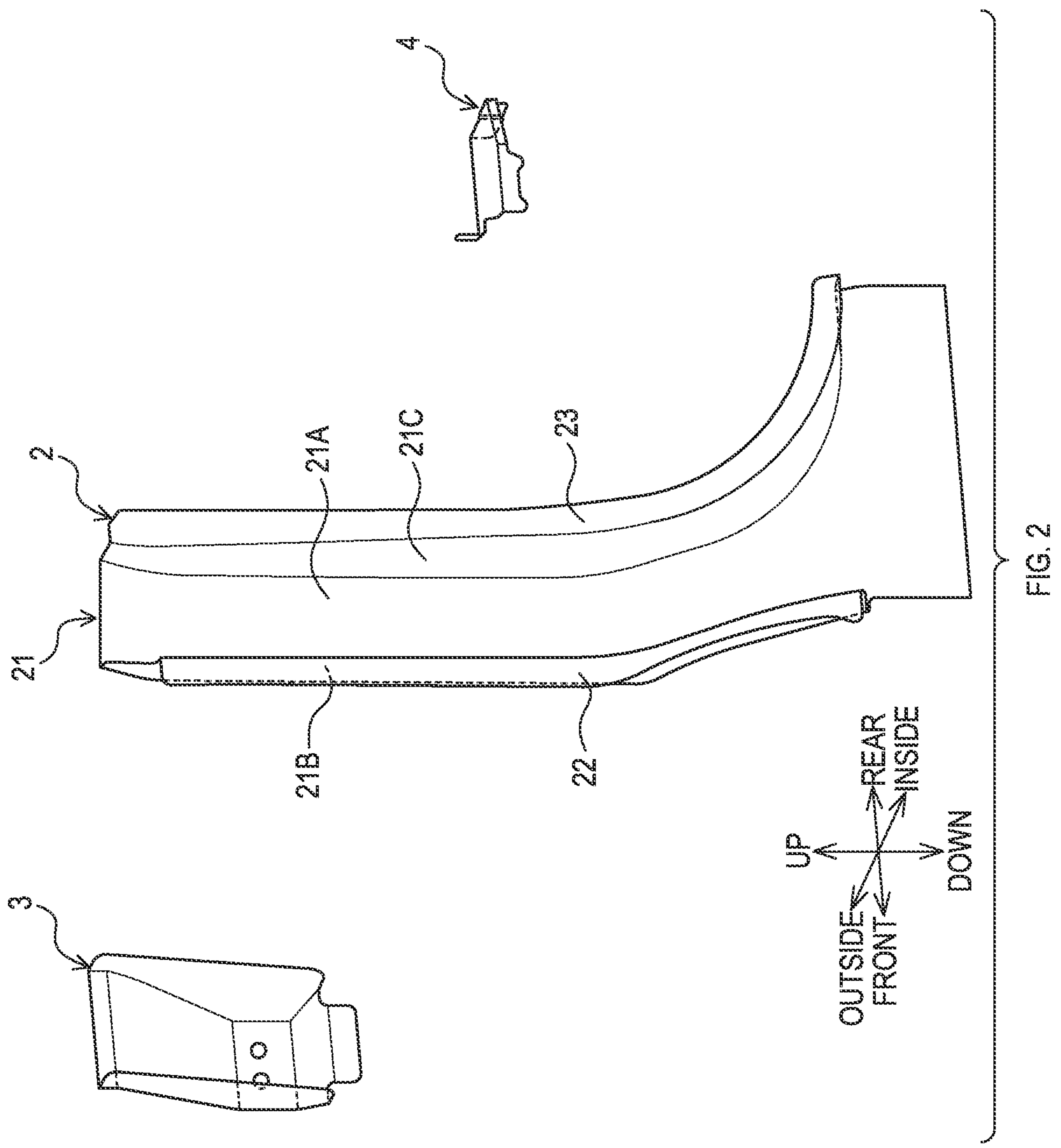
FIG. 2 is a schematic exploded perspective view of the front pillar lower of FIG. 1.

As shown in FIG. 2, the front pillar lower body 2 comprises a ridge portion 21, a first band plate 22, and a second band plate 23. A cross section of the front pillar lower body 2 perpendicular to longitudinal directions thereof has a hat-like shape.

The ridge portion 21 extends in the longitudinal directions of the front pillar lower body 2. A cross section of the ridge portion 21 perpendicular to longitudinal directions thereof has a substantially U shape. The ridge portion 21 protrudes outward in the width directions of the vehicle. The ridge portion 21 is formed by press-molding a metal plate that constitutes the front pillar lower body 2. The ridge portion 21 comprises a top plate 21A, a first side plate 21B, and a second side plate 21C.

The top plate 21A is a band-shaped part that extends along the longitudinal directions of the front pillar lower body 2. As shown in FIG. 3, a part of an outer surface (i.e., a plate surface on an outside) of the top plate 21A covered by the bracket 3 includes a flat surface.

As shown in FIG. 2, the first side plate 21B and the second side plate 21C extend respectively from two ends (i.e., a front end and a rear end) of the top plate 21A on both sides in width directions of the top plate 21A (i.e., directions perpendicular to the longitudinal directions of the top plate 21A), and face each other.

Plate surfaces of the first side plate 21B and the second side plate 21C intersect with a plate surface of the top plate 21A. The first side plate 21B constitutes a front wall of the ridge portion 21. The second side plate 21C constitutes a rear wall of the ridge portion 21.

A lower part of the ridge portion 21 is curved toward the rear side of the vehicle. Thus, the first side plate 21B is curved to bulge outward in the width directions of the ridge portion 21 (i.e., toward the front side of the vehicle). As viewed from a side of the vehicle, the first side plate 21B is slanted toward the lower side and the rear side of the vehicle. In other words, the first side plate 21B extends from an upper front side to a lower rear side of the vehicle.

The first band plate 22 and the second band plate 23 are arranged to be continuous with the ridge portion 21 respectively at outer sides of the ridge portion 21 in the width directions of the ridge portion 21, and constitute ends of the front pillar lower body 2 in the width directions of the front pillar lower body 2.

More specifically, the first band plate 22 extends from an end of the first side plate 21B of the ridge portion 21 to an opposite side from the ridge portion 21 (i.e., toward the front side). The second band plate 23 extends from an end of the second side plate 21C of the ridge portion 21 to an opposite side from the ridge portion 21 (i.e., toward the rear side).

<Bracket>

The bracket 3 is a metal plate member (specifically, a member obtained by bending a plate material by press working) for attaching a door hinge of the vehicle.

Figure 4A:
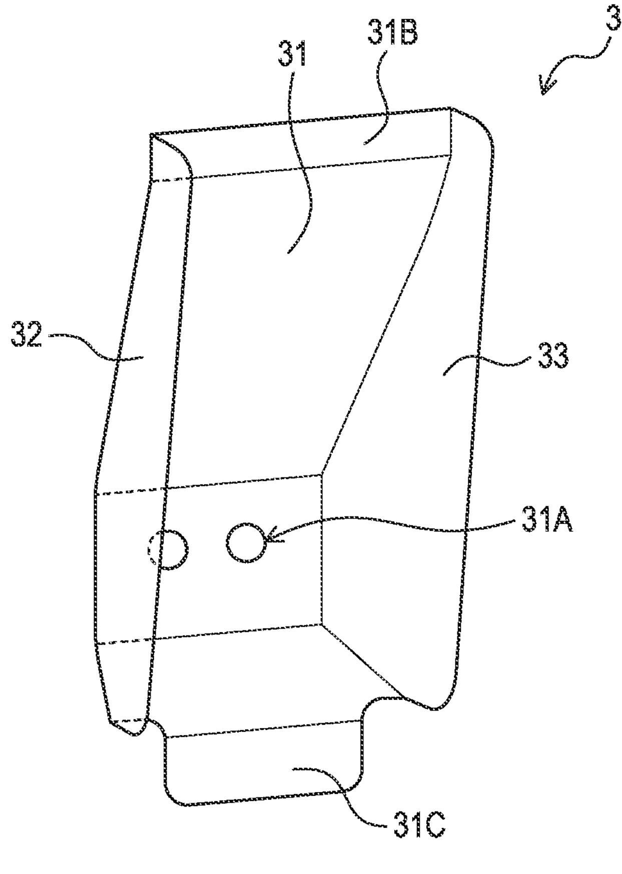
FIG. 4A is a schematic perspective view of a bracket in the front pillar lower of FIG. 2.

The bracket 3 is fixed to the ridge portion 21 of the front pillar lower body 2 from the outside in the width directions of the vehicle. As shown in FIG. 4A, the bracket 3 comprises a main cover 31, a first side cover 32, and a second side cover 33.

As shown in FIG. 3, the main cover 31 covers the top plate 21A from an outside of the ridge portion 21 of the front pillar lower body 2 to provide a space S between the main cover 31 and the top plate 21A of the ridge portion 21. An outer surface of the main cover 31 constitutes an attachment surface for the door hinge.

In other words, in the front pillar lower 1, the main cover 31 constitutes a portion protruding more outward in the width directions of the vehicle than the front pillar lower body 2. As viewed in the front-rear directions, the main cover 31 is curved to be convex toward the outside of the vehicle.

The main cover 31 comprises attachment holes 31A, an upper end portion 31B, and a lower end portion 31C. The attachment holes 31A are holes for attaching the door hinge using bolts. The attachment holes 31A communicate with the space S. In other words, the attachment holes 31A are provided in a position overlapping with the space S in thickness directions of the top plate 21A (i.e., in the width directions of the vehicle).

The upper end portion 31B is arranged above the attachment holes 31A and joined to the top plate 21A of the ridge portion 21 by welding. The lower end portion 31C is arranged below the attachment holes 31A and joined to the top plate 21A of the ridge portion 21 by welding.

Figure 5:
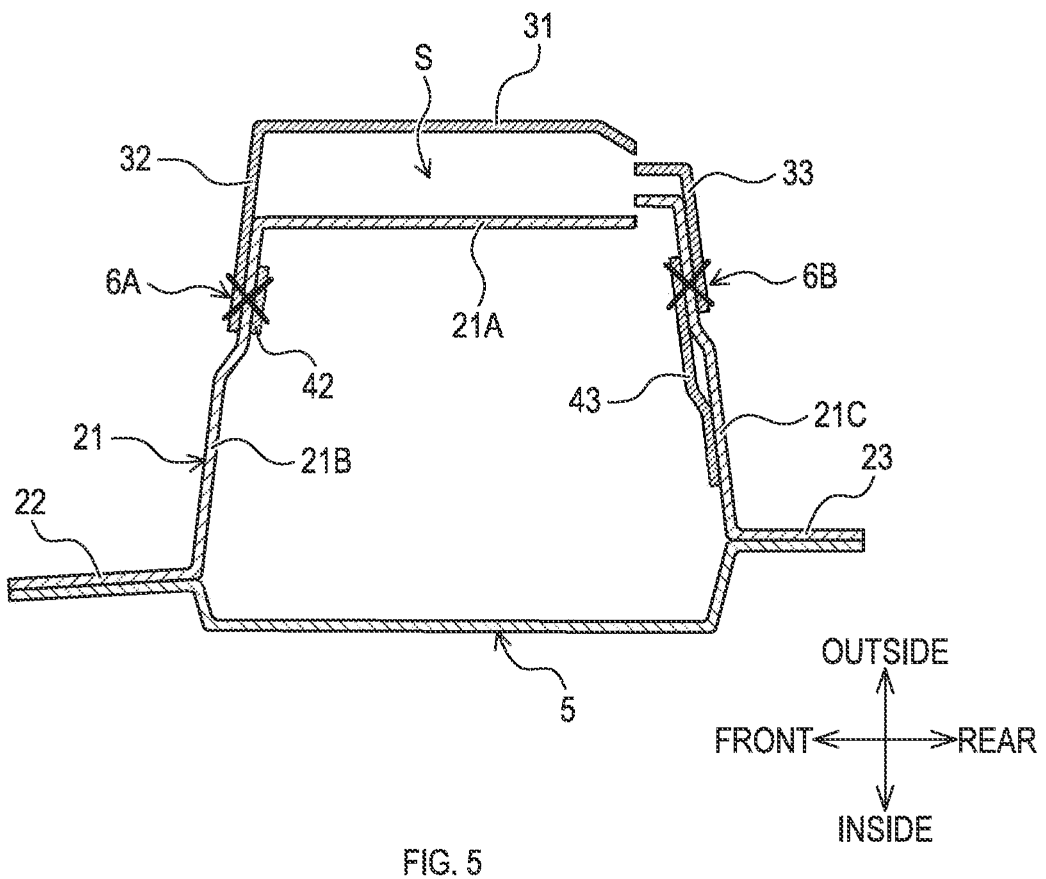
FIG. 5 is a schematic sectional end view taken along the line V-V of FIG. 1.

As shown in FIG. 5, the first side cover 32 extends from a front end of the main cover 31 inward in the width directions of the vehicle. The first side cover 32 is superposed on the first side plate 21B from the outside (specifically, the front side) of the ridge portion 21. The first side cover 32 is superposed on an area of the first side plate 21B including a portion (i.e., a corner) connected to the top plate 21A.

The second side cover 33 extends from a rear end of the main cover 31 inward in the width directions of the vehicle. The second side cover 33 is superposed on the second side plate 21C from the outside (specifically, the rear side) of the ridge portion 21. The second side cover 33 is superposed on an area of the second side plate 21C including a portion (i.e., a corner) connected to the top plate 21A.

The first side cover 32 and the second side cover 33 define the space S together with the main cover 31 and the top plate 21A. In other words, the space S is surrounded by the top plate 21A, the main cover 31, the first side cover 32, and the second side cover 33.

<Bulk>

Figure 4B:
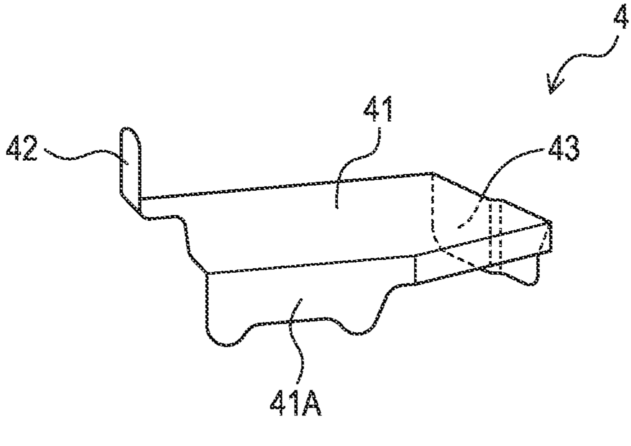
FIG. 4B is a schematic perspective view of a bulk in the front pillar lower of FIG. 2.

The bulk 4 shown in FIG. 4B is a metal plate member (specifically, a member obtained by bending a plate material by press working) for reinforcing the front pillar lower body 2. The bulk 4 is fixed to the inside of the ridge portion 21 of the front pillar lower body 2. The bulk 4 comprises a reinforcing portion 41, a first flange 42, and a second flange 43.

As shown in FIG. 3, the reinforcing portion 41 is arranged inside the ridge portion 21 in a position overlapping with the space S in the thickness directions of the top plate 21A (i.e., in the width directions of the vehicle). In other words, the reinforcing portion 41 is arranged on an inner side than the space S in the width directions of the vehicle.

A plate surface of the reinforcing portion 41 intersects with the up-down directions. The reinforcing portion 41 comprises an inner end portion 41A joined to the inner panel 5 by welding. In other words, the bulk 4 couples the front pillar lower body 2 and the inner panel 5 in the width directions of the vehicle.

As shown in FIG. 4B, the first flange 42 extends upward from a front end of the reinforcing portion 41. The second flange 43 extends downward from a rear end of the reinforcing portion 41. The first flange 42 is positioned above the second flange 43. In other words, the first flange 42 is joined to the front pillar lower body 2 in a position above the second flange 43.

As shown in FIG. 5, the first flange 42 is superposed on the first side plate 21B from an inside of the ridge portion 21. The first flange 42, together with the first side cover 32 of the bracket 3, holds therebetween the first side plate 21B in thickness directions of the first side plate 21B. In other words, at least a part of the first flange 42 overlaps with the first side cover 32 in the thickness directions of the first side plate 21B.

The second flange 43 is superposed on the second side plate 21C from the inside of the ridge portion 21. The second flange 43, together with the second side cover 33 of the bracket 3, holds therebetween the second side plate 21C in thickness directions of the second side plate 21C. In other words, at least a part of the second flange 43 overlaps with the second side cover 33 in the thickness directions of the second side plate 21C.

<Inner Panel>

The inner panel 5 is a metal plate member arranged on an inner side than the front pillar lower body 2 in the width directions of the vehicle.

The inner panel 5 has a plate surface facing the front pillar lower body 2. The inner panel 5 is joined to the first band plate 22 and the second band plate 23 of the front pillar lower body 2 by welding.

<Joining Parts>

As shown in FIG. 5, the front pillar lower 1 comprises a first joining part 6A and a second joining part 6B.

Each of the first joining part 6A and the second joining part 6B is a welding spot where three components, namely the front pillar lower body 2, the bracket 3, and the bulk 4, are joined together at one point by spot welding.

Specifically, the first joining part 6A joins the first side plate 21B of the front pillar lower body 2, the first side cover 32 of the bracket 3, and the first flange 42 of the bulk 4. The first joining part 6A is formed by superposing the first side cover 32 and the first flange 42 on both sides of the first side plate 21B respectively, and then performing welding from the first side cover 32 to the first flange 42 through the first side plate 21B.

The second joining part 6B joins the second side plate 21C of the front pillar lower body 2, the second side cover 33 of the bracket 3, and the second flange 43 of the bulk 4. The second joining part 6B is formed by superposing the second side cover 33 and the second flange 43 on both sides of the second side plate 21C respectively, and then performing welding from the second side cover 33 to the second flange 43 through the second side plate 21C.

Meanwhile, the front pillar lower 1 may comprise two or more first joining parts 6A and two or more second joining parts 6B, both of which are arranged along the up-down directions. The second flange 43 of the bulk 4 is further joined to the second side plate 21C by welding in an area on an inner side than the second joining part 6B in the width directions of the vehicle (i.e., in an area closer to the inner panel 5).

The front pillar lower 1 can be manufactured by a manufacturing method including a welding process for forming the first joining part 6A and the second joining part 6B as well as other joining parts.

1-2. Actions

The bracket 3 and the bulk 4 are simultaneously welded to the front pillar lower body 2 at the first joining part 6A and the second joining part 6B.

When a load is applied to the front pillar lower 1 from the front side of the vehicle (e.g., when the vehicle crashes head-on), the first joining part 6A and the second joining part 6B can receive the load in shear directions against deformation that causes the front pillar lower 1 to open in the width directions of the vehicle. Thus, a joint strength at the first joining part 6A and the second joining part 6B is improved.

1-3. Effects

With the embodiment detailed above, following effects can be obtained.

(1a) Since the bracket 3 and the bulk 4 can be joined to the ridge portion 21 simultaneously at the first joining part 6A and the second joining part 6B, the joining order of the bracket 3 and the bulk 4 can be eliminated. In addition, since the load in the width directions of the vehicle can be received in the shear directions at the first joining part 6A and the second joining part 6B, the deformation of the front pillar lower body 2 away from the inner panel 5 can be inhibited.

(1b) Provision of the second joining part 6B in addition to the first joining part 6A can increase the joint strength among the ridge portion 21, the bracket 3, and the bulk 4. As a result, the effect of inhibiting the deformation of the bracket 3 is facilitated.

(1c) The first flange 42 of the bulk 4 joined to the curved first side plate 21B is positioned above the second flange 43, whereby the bulk 4 can be formed by press-molding without producing a negative angle part.

(1d) Since the part of the outer surface of the top plate 21A covered by the bracket 3 includes a flat surface, occurrence of cracks and wrinkles in the front pillar lower body 2 can be reduced.

2. Other Embodiments

While the embodiment of the present disclosure has been described above, the present disclosure is not limited to the above-described embodiment but may take various forms.

(2a) The front pillar lower of the above-described embodiment does not necessarily have to have the second joining part. In other words, in the front pillar lower, the first joining part alone may join the three components, namely the front pillar lower body, the bracket, and the bulk.

(2b) In the front pillar lower of the above-described embodiment, the shape of the bulk is not limited to the shape described above. For example, the first flange of the bulk does not necessarily have to be positioned above the second flange. In addition, the position of the bulk in the up-down directions can be arbitrarily adjusted within an area overlapping with the space formed by the ridge portion and the bracket.

Figure 6:
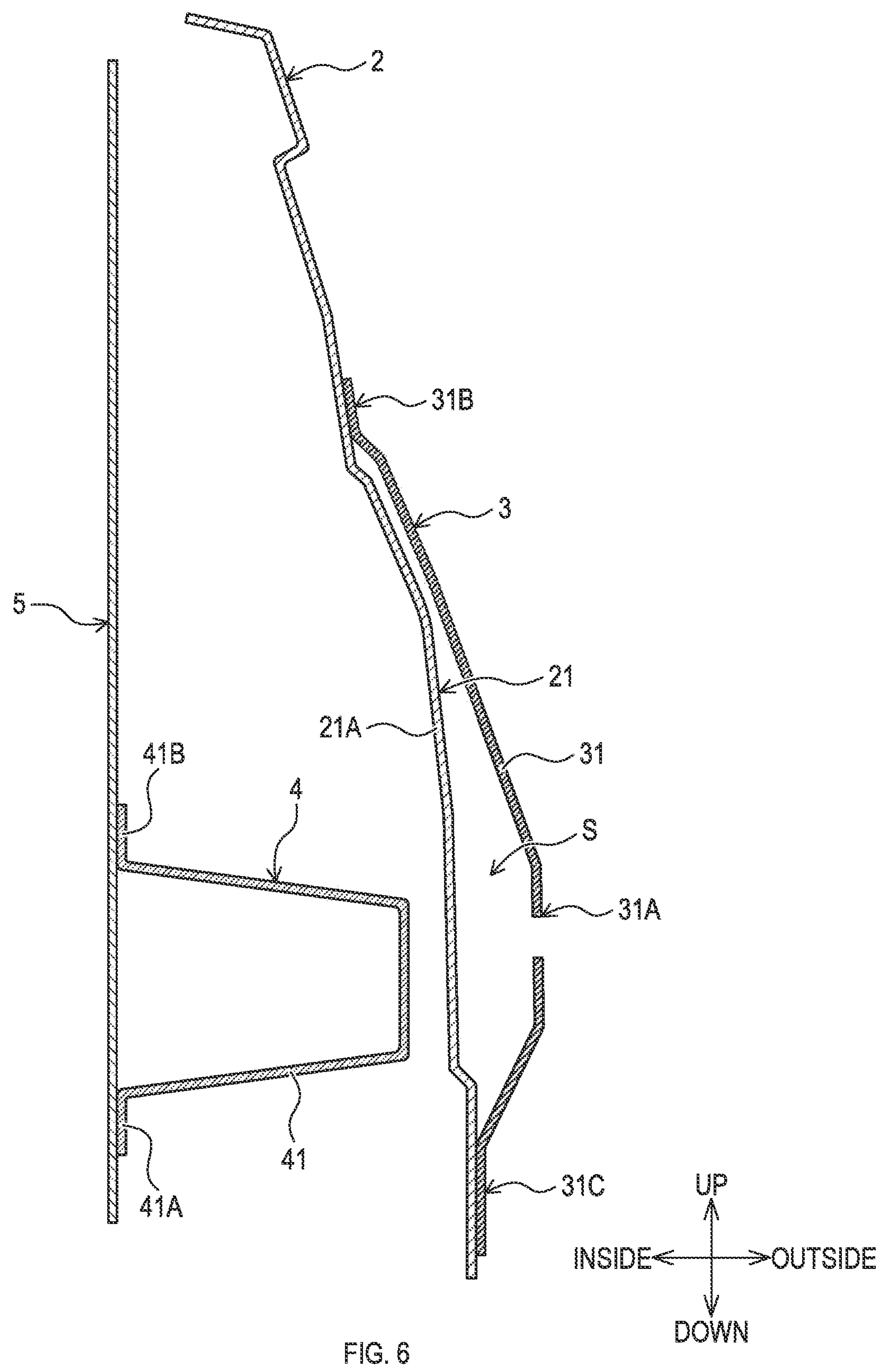
FIG. 6 is a schematic sectional end view of a front pillar lower in an embodiment different from that of FIG. 1.

Furthermore, as shown in FIG. 6, a section of the bulk 4 viewed in the front-rear directions may have a hat-like shape. In the bulk 4 of FIG. 6, the reinforcing portion 41 comprises the first inner end portion 41A and a second inner end portion 41B. The first inner end portion 41A and the second inner end portion 41B are joined to the inner panel 5 at different positions in the up-down directions.

(2c) In the front pillar lower of the above-described embodiment, the outer surface of the top plate of the ridge portion does not necessarily have to include a flat surface.

(2d) A function performed by a single element in the above-described embodiments may be distributed among a plurality of elements, and a function performed by a plurality of elements may be integrated in a single element. Also, a part of a configuration of the above-described embodiments may be omitted. Further, at least a part of a configuration of the above-described embodiments may be added to, or may replace, another configuration of the above-described embodiments. Any form included in the technical idea specified by the language of the claims may be an embodiment of the present disclosure.

What is claimed is:

1. A front pillar lower comprising:

a front pillar lower body extending in up-down directions;

a bracket that is fixed to the front pillar lower body and that includes an attachment surface for a door hinge;

a bulk fixed to the front pillar lower body; and a first joining part where the front pillar lower body, the bracket, and the bulk are joined together, the front pillar lower body including a ridge portion extending in longitudinal directions of the front pillar lower body, the ridge portion including:

a top plate; and a first side plate and a second side plate extending respectively from two ends of the top plate on both sides in width directions of the front pillar lower body, the bracket including:

a main cover covering the top plate from an outside of the ridge portion to provide a space between the main cover and the top plate;

a first side cover superposed on the first side plate from the outside of the ridge portion; and a second side cover superposed on the second side plate from the outside of the ridge portion, the bulk including:

a reinforcing portion arranged inside the ridge portion in a position overlapping with the space in thickness directions of the top plate, the reinforcing portion being a plate-shaped portion expanding along the width directions and the thickness directions;

a first flange superposed on the first side plate from an inside of the ridge portion; and a second flange superposed on the second side plate from the inside of the ridge portion, and the first flange and the second flange being provided at a first end and a second end of the reinforcing portion in the width directions respectively, and the first joining part joining the first side plate, the first side cover, and the first flange.

2. The front pillar lower according to claim 1, further comprising:

a second joining part joining the second side plate, the second side cover, and the second flange.

3. The front pillar lower according to claim 1, wherein the first side plate is slanted toward a lower side and a rear side of a vehicle as viewed from a side of the vehicle, and wherein the first flange of the bulk is positioned above the second flange.

4. The front pillar lower according to claim 1, wherein a part of an outer surface of the top plate covered by the bracket includes a flat surface.

5. The front pillar lower according to claim 2, wherein the first side plate is slanted toward a lower side and a rear side of a vehicle as viewed from a side of the vehicle, and wherein the first flange of the bulk is positioned above the second flange.

6. The front pillar lower according to claim 2, wherein a part of an outer surface of the top plate covered by the bracket includes a flat surface.

* * * * *